UNITED STATES PATENT OFFICE.

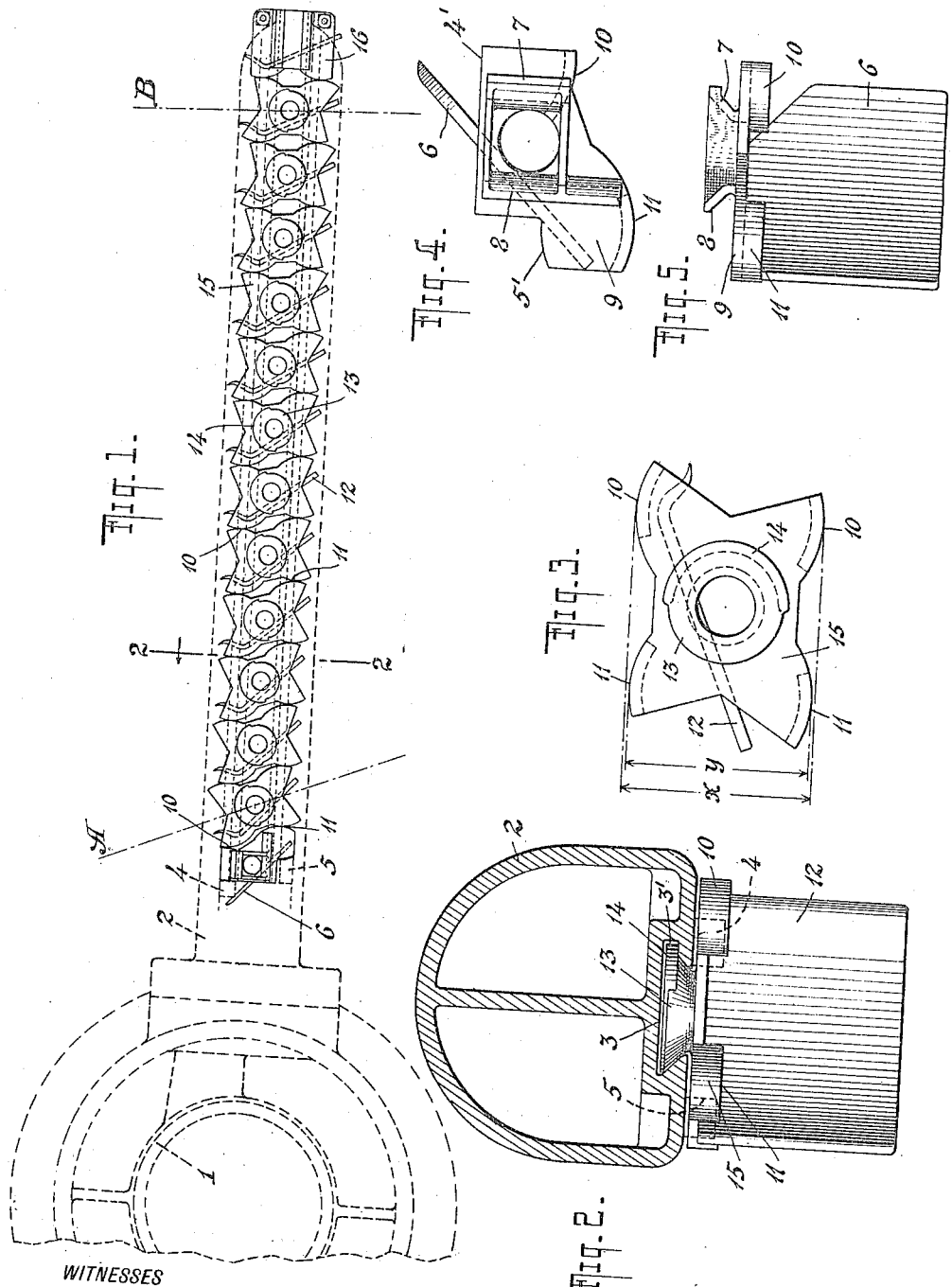

HARRY H. STOUT, OF NEW YORK, N. Y., ASSIGNOR TO GENERAL CHEMICAL COMPANY, OF NEW YORK, N. Y., A CORPORATION OF NEW YORK.

RABBLE-TOOTH.

1,234,408.  Specification of Letters Patent.  Patented July 24, 1917.

Application filed March 9, 1915. Serial No. 13,237.

*To all whom it may concern:*

Be it known that I, HARRY H. STOUT, a citizen of the United States, and a resident of the borough of Manhattan, city, county, and State of New York, have invented certain new and useful Improvements in Rabble-Teeth, of which the following, taken in connection with the accompanying drawings, is a specification.

My invention relates to a tooth and rabble arm construction for roasting furnaces, such as ore roasting furnaces of the general type described in the United States Letters Patent to John B. F. Herreshoff No. 616,926, dated January 3, 1899, in which the material under treatment is stirred about and gradually moved over the furnace hearths by a rotary stirring system comprising rabble arms provided with teeth for engaging with the said material. More particularly it relates to such constructions in which the blades of the rabble arm teeth or portions of said blades are positioned at progressively varying angles with respect to the rabble arm. Among the practical difficulties and objections in connection with the employment of teeth which are required to be positioned at varying angles may be mentioned the necessity of manufacturing a number of different teeth for each arm, each tooth being unlike the others with respect to the angle of its blade, and the necessity of using great care in assembling the teeth on the arm so that the various angles of inclination will be in proper sequence. The main object of my invention, generally speaking, is to provide a construction of rabble arm and tooth such that all of the teeth may be identically fashioned and that they may be self-adjusting as to angle of inclination; another object is to provide a suitable construction whereby the proper assemblage of the teeth on the arm is insured; other objects will be specifically pointed out or will otherwise appear in the following description of the embodiment of my invention shown in the accompanying drawings in which—

Figure 1 is a plan view of the teeth in assembled relation upon a rabble arm, the arm and supporting shaft being shown by dotted lines, Fig. 2 is an enlarged cross section on the line 2—2 of Fig. 1, Fig. 3 is a plan view of the tooth shown in Fig. 2, Fig. 4 is a plan view of the innermost tooth, and Fig. 5 is a side elevation of the said innermost tooth.

The central shaft 1 and the various rabble arms 2 may be provided in any known manner with passages for conducting a cooling medium. Each of the rabble arms 2, of which only one is illustrated, is provided on its under side with a suitable longitudinal groove, such as the dove-tail groove 3, into which correspondingly shaped tongues on the upper ends of the teeth are adapted to extend, so that the teeth will be secured to the arm. It will readily be understood that the groove extends through the end of the arm and that the teeth tongues are entered into the groove at this point and then slid along the arm into position. The lower surface of the arm is also provided near the inner end thereof with depending stop lugs 4 and 5 for engaging with portions of the innermost tooth so as to determine its location and angular position.

The teeth secured to the arm may all be of the same form, but in the construction shown the innermost and outermost teeth differ somewhat from the others.

The innermost tooth, as shown, is provided with a straight scraper 6 and with a tongue for engaging with the dove-tail groove of the arm; as will be noted particularly from Figs. 4 and 5 this tongue consists of upwardly extending diverging walls 7 and 8. In a plane below the tongue, the tooth is provided with a horizontal extension 9 adapted at its edge 4' to abut the stop lug 4 and at its edge 5' to abut the stop lug 5. The extension 9 is also provided with curved surfaces 10 and 11 adapted to contact with correspondingly curved surfaces on the next tooth.

The tooth adjoining the innermost tooth is provided with a suitable or engaging blade, such as the bent blade 12, said blade having a forward portion to enter the ore and move it backwardly or toward the shaft 1 and a rearward or discharge portion at an angle to the forward portion to move the ore forwardly or toward the periphery of the hearth. The upper portion of this tooth is provided with a tongue 13 so shaped as to correspond with the shape of the groove 3 in the arm and also to permit of the turning of the tooth about an axis perpendicular to the longitudinal axis of the arm.

As shown, the groove 3 is unsymmetrical in that one of its side walls is in the form of an angular, undercut surface whereas the other has a similar surface cut away so as to form a recess 3'. The tongue 13 is circular in form; about one half of the tongue is of the general form of an inverted truncated cone but the other half is provided with a horizontal extension or shoulder 14; the circular, beveled or conical half is adapted to contact with the angular, undercut surface of the groove above referred to, while the half which is provided with the extension 14 contacts with the opposite side wall of the groove, the extension 14 projecting into the recess above described. All of the teeth on the arm are identical in construction with that just described with the exception of the innermost and outermost teeth.

It will be readily seen that when the tongues 13 are inserted into the groove 3, the teeth will be held supported by the arm and that due to the unsymmetrical arrangement of tongue and groove, the teeth must be assembled in proper orientation upon the arm, it being possible to place the tongues in the groove only when the teeth are pointed in the same direction. It will be seen further that because of the generally conical form of the tongues, the individual teeth are capable of being rotated about a vertical axis to a limited extent, that is, until the ends of the tongue extensions 14 come into contact with the angular, undercut wall of the groove. The extent of this variation will of course depend upon the length of the extension 14 which may be of any other length than the length shown, which is half the circumference of the tongue 13. This limited rotation may be very slight in practice, its purpose being to allow the tooth sufficient freedom of angular motion so that it can adjust itself against the surfaces which determine its angular position.

In a plane below the tongue 13, each tooth is provided with a horizontal extension 15, the sides of which are formed into curved surfaces 10 at the forward end of the tooth and curved surfaces 11 at the rearward end of the tooth, said surfaces being adapted respectively to abut the correspondingly curved surfaces 10 and 11 of the extensions of the adjoining teeth on the arm. The various bearing surfaces 10 and 11 are cylindrical surfaces but the radius of curvature for the surfaces 10 is slightly greater than that for the surfaces 11, the centers of curvature for both surfaces being in the longitudinal axis of the tooth. Accordingly the greatest width of the tooth at its forward end, represented by the distance $x$ (Fig. 3) is slightly greater than its greatest width at its rearward end, represented by the distance $y$, and the extension 15 may in a sense be said to be of the shape of a wedge with curved faces, a portion of its sides between the curved faces being cut away so as to give space for portions of the extensions 15 of the adjoining teeth.

When several teeth provided with these wedge-shaped extensions are assembled on the arm, the surfaces 10 and 11 of each tooth will come into contact with the similar surfaces of the adjoining teeth, the pivotal tongues permitting of rotational self-adjustment, and the axis of each tooth will be slightly variant in direction from that of the adjoining teeth. For example the axis of the tooth next to the innermost tooth will point in the direction indicated by the dot and dash line A (Fig. 1); the next succeeding tooth will point at a slightly increased angle with respect to the arm and the angular position of each succeeding tooth will vary by the same angular amount with respect to its predecessor in the line, the angles increasing substantially in arithmetical progression so that the tooth next to the outermost tooth will point in the direction indicated by the line B. The teeth are thus positioned at progressingly varying angles to the arm although the teeth themselves are identical in structure. The outermost tooth 16 is also provided with surfaces adapted to co-act with the surfaces 10 and 11 of the adjacent tooth and may otherwise be similar in general construction to the innermost tooth except that provision is made whereby it may be bolted or otherwise secured to the arm.

I have illustrated my invention in connection with a single rabble arm adapted to propel the material under treatment outwardly from the shaft 1 but I desire it to be understood that my invention includes also the obvious arrangement of parts which will effect inward propulsion.

The varying angular arrangement of the teeth and their blades is productive of many advantages which are well understood in the art; the particular advantages of the structure shown in which the angular blades 12 are included are substantially the maintenance of an even bed of ore on all parts of the hearth and the forward movement of an equal quantity of ore by each tooth during each revolution of the arm substantially as in the case of the subject matter of my application Serial Number 798,209, filed Oct. 30, 1913. The present invention makes possible the realization of these advantages of tooth arrangement with a set of identically fashioned teeth. Heretofore it was necessary to design and fashion each tooth specifically for its particular location on the arm.

I claim:

1. A rabble arm, a series of identically fashioned teeth secured thereto, and means for causing all the teeth to automatically assume definite but different angles with respect to said arm.

2. A rabble arm, a series of identically fashioned teeth secured thereto, and means for causing all the teeth to automatically assume definite angular positions with reference to the rabble arm which are progressively different in the order of the consecutive teeth.

3. In combination, a rabble arm, a series of identical teeth depending therefrom and extending at varying angles thereto, means comprising a portion of each tooth and contacting with an adjoining tooth for determining the angular position of each tooth and means for securing each tooth in its determined position.

4. In combination, a rabble arm and a series of identical teeth depending therefrom and extending at progressively varying angles thereto, abutting extensions on the teeth for determining the angular position of each tooth and means for securing each tooth in its determined position.

5. In combination, a rabble arm and a series of identical teeth pivotally depending therefrom and extending at successively increasing angles thereto, abutting extensions on the teeth for determining the angular position of each tooth, said extensions being generally wedge-shaped and having circular abutting surfaces, the radius of the forward abutting surface being slightly greater than that of the rearward abutting surface and means for securing each tooth in its determined position.

6. In combination, a rabble arm provided with an undercut groove, a rabble tooth provided with a circular tongue, said tongue being positioned in said groove, whereby the tooth is slidably and rotatably secured to said arm and means for locking the tooth in operative position.

7. In combination with a rabble arm having a longitudinal groove along its lower surface, a tooth having a circular beveled tongue engaging said groove and permitting rotation of the tooth about the center of the circular tongue, a shoulder extending around a portion of the circumference of the beveled tongue, a recess along one side of said groove adapted to engage the shoulder on said tongue and means for locking the tooth in operative position.

8. In combination with a rabble arm for roasting furnaces, a rabble tooth, a slot in said rabble arm, and a circular tongue on said rabble tooth engaging said slot and permitting longitudinal and pivotal movement of the tooth, means for limiting said pivotal movement within a predetermined angle and means for locking the tooth in operative position.

9. A rabble arm for roasting furnaces, said rabble arm being provided with an unsymmetrical groove along its lower surface, rabble teeth provided with an unsymmetrical tongue adapted to engage said groove, the unsymmetrical portions of said tongue corresponding with the unsymmetrical portions of said groove in such manner as to permit of pivotal movement of the tooth within predetermined limits and means for locking the tooth in operative position.

10. A rabble arm for roasting furnaces, said rabble arm being provided with an unsymmetrical groove along its lower surface, rabble teeth provided with an unsymmetrical tongue adapted to engage said groove, the unsymmetrical portions of said tongue corresponding with the unsymmetrical portions of said groove in such manner as to determine the orientation of the tooth with regard to the arm within predetermined limits and means for locking the tooth in operative position.

11. In combination with a rabble arm for roasting furnaces, a series of teeth, circular tongues upon said teeth, a groove extending along the lower surface of said arm and adapted to engage said tongues, bearing surfaces upon said teeth adapted to form contacts between adjacent teeth and to determine the relative position of such adjacent teeth, terminal members locked to said arm and having bearing surfaces adapted to contact with bearing surfaces upon the extreme teeth upon said arm and to determine the angular position of said extreme teeth with regard to the axis of the arm.

12. In combination a rabble arm and a series of identically fashioned teeth depending therefrom, each of said teeth being provided with entering and discharge portions at an angle to each other and to the rabble arm, the entering portions of said teeth being adapted to move material in one direction and the discharge portions thereof being adapted to move a substantially equal quantity in another direction, contact pieces upon each tooth adapted to form contacts between adjacent teeth and to lock adjacent teeth in a predetermined relative position.

13. In combination with a rabble arm for roasting furnaces, a rabble tooth provided with a circular tongue adapted to engage with a groove upon said rabble arm, two contact pieces upon said rabble tooth fashioned in the form of segments of circles, the radius of one of the said circular segments being greater than the radius of the other circular segment, said contact pieces being adapted to form contacts between adjacent teeth when assembled in operative position on the rabble arm.

14. In combination, a rabble arm and a series of identically fashioned teeth depending therefrom, each of said teeth being provided with entering and discharge portions at an angle to each other and to the rabble arm, the entering portions of said teeth being adapted to move material in one direction and the discharging portions thereof being each adapted to move material in another direction, the amount of material moved in said last named direction being the same in quantity for each tooth, contact pieces upon each tooth adapted to form contacts between adjacent teeth and to lock them in a predetermined relative position at angles to the axis of the arm which successively increase from the center of the furnace outward.

In testimony whereof I have hereunto set my hand in the presence of two subscribing witnesses.

HARRY H. STOUT.

Witnesses:
JOHN A. FERGUSON,
FRANK F. KIRKPATRICK.

Copies of this patent may be obtained for five cents each, by addressing the "Commissioner of Patents, Washington, D. C."